United States Patent
Conrad et al.

(10) Patent No.: US 9,556,903 B2
(45) Date of Patent: Jan. 31, 2017

(54) RUBBER-METAL SLEEVE BEARING

(71) Applicant: AUDI AG, Ingolstadt (DE)

(72) Inventors: Thomas Conrad, Treuchtlingen (DE); Friedrich-Oskar Winter, Nennslingen (DE); Jörg Roland, Hagen (DE)

(73) Assignee: AUDI AG, Ingolstadt (DE)

( * ) Notice: Subject to any disclaimer, the term of this patent is extended or adjusted under 35 U.S.C. 154(b) by 8 days.

(21) Appl. No.: 14/640,977

(22) Filed: Mar. 6, 2015

(65) Prior Publication Data
US 2015/0252842 A1    Sep. 10, 2015

(30) Foreign Application Priority Data

Mar. 8, 2014 (DE) .................. 10 2014 003 324

(51) Int. Cl.
*B60G 11/22* (2006.01)
*F16C 27/06* (2006.01)
*F16C 17/02* (2006.01)

(52) U.S. Cl.
CPC ............. *F16C 27/063* (2013.01); *F16C 17/02* (2013.01); *F16C 2220/48* (2013.01)

(58) Field of Classification Search
CPC ........ B60G 2204/41; F16F 1/38; F16C 27/063
USPC ....................................................... 267/293
See application file for complete search history.

(56) References Cited

U.S. PATENT DOCUMENTS

| | | | |
|---|---|---|---|
| 2,223,872 A * | 12/1940 | Humphreys ............ | F16C 23/04 384/222 |
| 2,940,785 A * | 6/1960 | Haushalter .............. | F16C 27/08 267/282 |
| 4,491,429 A * | 1/1985 | Matoba .................... | B60G 7/00 267/154 |
| 5,080,334 A | 1/1992 | Mihara et al. | |
| 5,364,191 A * | 11/1994 | Gruber .................... | B62D 7/16 384/153 |
| 5,540,420 A * | 7/1996 | Luzsicza ............... | F16C 27/063 267/141.1 |
| 5,887,859 A | 3/1999 | Hadano et al. | |

(Continued)

FOREIGN PATENT DOCUMENTS

| DE | 43 38 169 A1 | 5/1994 |
|---|---|---|
| DE | 102 41 246 A1 | 3/2004 |

(Continued)

OTHER PUBLICATIONS

Chinese Search Report issued on Jul. 19, 2016 with respect to counterpart Chinese patent application 201510100460.6.

(Continued)

*Primary Examiner* — Robert A Siconolfi
*Assistant Examiner* — Mahbubur Rashid
(74) *Attorney, Agent, or Firm* — Henry M. Feiereisen LLC

(57) ABSTRACT

A rubber-metal sleeve bearing includes an inner sleeve, an outer sleeve disposed in concentric relationship to the inner sleeve, and an intermediate sleeve disposed in concentric relationship to the inner and outer sleeves and having first and second elastomer layers to connect the intermediate sleeve to the inner and outer sleeves, respectively. The intermediate sleeve has inner and outer surfaces, each having at least one non-round section, with the non-round section of the inner surface and the non-round section of the outer surface being arranged in offset relationship in a circumferential direction.

8 Claims, 1 Drawing Sheet

(56) References Cited

U.S. PATENT DOCUMENTS

| | | | | |
|---|---|---|---|---|
| 2001/0040326 A1* | 11/2001 | Balczun | ................ | F16C 27/063 267/141 |
| 2002/0060385 A1* | 5/2002 | Mayerbock | .............. | B60G 7/02 267/293 |
| 2003/0020223 A1* | 1/2003 | Kameda | ................... | B21J 9/025 267/293 |
| 2003/0111780 A1* | 6/2003 | Ogawa | .................... | F16F 1/371 267/140.12 |
| 2004/0213491 A1 | 10/2004 | Kammel et al. | | |
| 2007/0085253 A1* | 4/2007 | Franke | .................. | F16F 1/3842 267/293 |
| 2007/0290425 A1* | 12/2007 | Heuer | ................... | F16F 1/3814 267/293 |
| 2009/0289399 A1* | 11/2009 | Suzuki | ..................... | B60G 3/20 267/140.12 |
| 2011/0127744 A1* | 6/2011 | Siebeneick | .......... | B60G 21/052 280/124.128 |

FOREIGN PATENT DOCUMENTS

| | | |
|---|---|---|
| DE | 10 2009 053 592 A1 | 5/2011 |
| DE | 10 2011 101 182 A1 | 1/2012 |
| DE | 10 2011 051 036 A1 | 12/2012 |
| FR | 2 555 688 A1 | 5/1985 |
| JP | 2008-45710 A | 2/2008 |

OTHER PUBLICATIONS

English translation of Chinese Search Report issued on Jul. 19, 2016 with respect to counterpart Chinese patent application 201510100460.6.

\* cited by examiner

RUBBER-METAL SLEEVE BEARING

CROSS-REFERENCES TO RELATED APPLICATIONS

This application claims the priority of German Patent Application, Serial No. 10 2014 003 324.4, filed Mar. 8, 2014, pursuant to 35 U.S.C. 119(a)-(d), the disclosure of which is incorporated herein by reference in its entirety as if fully set forth herein.

BACKGROUND OF THE INVENTION

The present invention relates to a rubber-metal sleeve bearing.

The following discussion of related art is provided to assist the reader in understanding the advantages of the invention, and is not to be construed as an admission that this related art is prior art to this invention.

Rubber-metal sleeve bearings find application in the automotive industry for example as link bearings in the chassis. An outer sleeve of the sleeve bearing is hereby pressed into an opening of the chassis control arm whereas a throughbore of an inner sleeve may receive a fastener.

It would be desirable and advantageous to provide an improved rubber-metal sleeve bearing which obviates prior art shortcomings and is configured to exhibit different cardanic rigidities in various spatial directions.

SUMMARY OF THE INVENTION

According to one aspect of the present invention, a rubber-metal sleeve bearing includes an outer sleeve, an inner sleeve disposed in concentric relationship to the inner sleeve, and an intermediate sleeve disposed in concentric relationship to the inner and outer sleeves and having first and second elastomer layers to connect the intermediate sleeve to the inner and outer sleeves, respectively, the intermediate sleeve having inner and outer surfaces, each having at least one non-round section, with the non-round section of the inner surface and the non-round section of the outer surface being arranged in offset relationship in a circumferential direction.

By providing the intermediate sleeve with an inner surface that has at least one non-round section and an outer surface that has at least one non-round section, i.e. an intermediate sleeve with non-round inner and outer diameters, with the non-round sections being arranged in offset relationship, rather than adjacent to one another, the cardanic rigidity can be adjusted in the respective spatial directions in a desired manner. For example, such rubber-metal sleeve bearings can be used in chassis control arms of motor vehicles that are cardanically soft in one spatial direction while yet exhibiting a high torsional stiffness in the same spatial direction. The thickness of the intermediate sleeve thus changes in areas thereof about its circumference, with inner flattened sections alternating with outer flattened sections. The inner sleeve receives a fastener, for example a bolt, and for that purpose is provided with a cylindrical throughbore.

According to another advantageous feature of the present invention, the inner sleeve can be made of metal. The outer sleeve, which may also be made of metal, is disposed in surrounding relation to the rubber-metal bearing and may be pressed into a receiving opening of the chassis control arm. Inner sleeve, intermediate sleeve, and outer sleeve are arranged in concentric relation from inside to outside in this sequence, with a wrap-around gap being demarcated between the sleeves, i.e. a gap between the inner sleeve and the intermediate sleeve, and a gap between the intermediate sleeve and the outer sleeve. An elastomer element fills out each of the gaps. The elastomer elements are vulcanized onto the sleeves and maintain the sleeves in their relative positions in an elastically yielding manner.

According to another advantageous feature of the present invention, the inner sleeve can have an outer surface having at least one non-round section, with the non-round section of the outer surface of the inner sleeve and the non-round section of the inner surface of the intermediate sleeve arranged adjacent to one another. By positioning the non-round sections of the outer surface of the inner sleeve and the inner surface of the intermediate sleeve next to one another or in superimposed relation, the cardanic rigidity of the rubber-metal sleeve bearing can be enhanced further in the respective spatial direction because the elastomer layer is thinner in this region.

According to another advantageous feature of the present invention, the inner and outer surfaces of the intermediate sleeve can have each two non-round sections in opposition to one another. In this way, the intermediate sleeve is subdivided in four adjacent regions, with the non-round sections on the inner and outer surfaces alternating during revolution. Currently preferred is the presence of a non-round section on the inner surface or the outer surface after every 90°.

According to another advantageous feature of the present invention, the inner surface and/or the outer surface of the intermediate sleeve can have a spherical configuration, with the non-round section of the inner surface and the non-round section of the outer surface each being configured as flat areas. The presence of a basically spherical or bulbed configuration of the intermediate sleeve, i.e. a concave inner surface and a convex outer surface, promotes cardanic behavior of the rubber-metal sleeve bearing. The non-round sections are formed in this basic form by flat areas that extend along the respective parts of the intermediate sleeve. The same applies for the inner sleeve, with the outer surface of the inner sleeve being spherical and the non-round sections being formed by flat areas. Inner sleeve and intermediate sleeve have complementing shapes so that a desired thickness and dispersion of the elastomer layer is established there between.

According to another advantageous feature of the present invention, the intermediate sleeve can be made of plastic. Advantageously, the intermediate sleeve is made by an extrusion process. The provision of an extruded plastic has the advantage that an intermediate sleeve with complex geometry can be produced on a large scale in a simple and cost-effective manner.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a perspective, partly sectional illustration of a detail of an intermediate sleeve of the rubber-metal sleeve bearing of FIG. 1a.

DETAILED DESCRIPTION OF PREFERRED EMBODIMENTS

Figure 1:
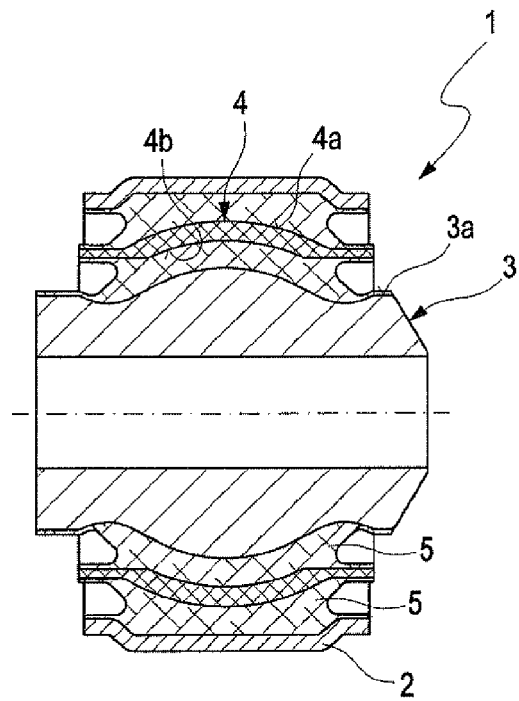
FIG. 1a is a sectional view of a rubber-metal sleeve bearing according to the present invention.
FIG. 1b is a sectional view of the rubber-metal sleeve bearing of FIG. 1a in 90°-rotated disposition.
Figure 1:
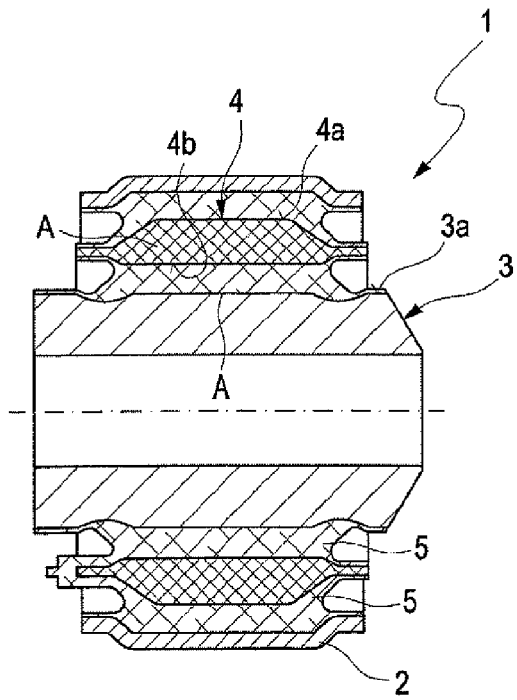

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1a, there is shown a sectional view of a rubber-metal sleeve bearing according to the present invention, generally designated by reference numeral 1. The rubber-metal sleeve bearing 1 has an inner sleeve 3 of metal and is provided with a central throughbore for receiving a screw fastener, not shown. The inner sleeve 3 has an outer surface 3a on which a first elastomer layer 5 is applied all-round. Disposed adjacent to this inner first elastomer layer 5 is an intermediate sleeve 4 of plastic, with the intermediate sleeve 4 and the inner sleeve 3 arranged in concentric relationship and respectively connected with the first elastomer layer 5 through vulcanization. The intermediate sleeve 4 has an outer surface 4a on which a second elastomer layer 5 is applied all-round and arranged between the outer surface 4a of the intermediate sleeve 4 and an inner surface of an outer sleeve 2 of metal. The second elastomer layer 5 is also being vulcanized onto the intermediate sleeve 4 and the outer sleeve 2, respectively.

In accordance with the present invention, both the intermediate sleeve 4 and the inner sleeve 3 do not have a rotation-symmetric configuration. As shown in FIG. 1b, the generally spherical outer surface 3a of the inner sleeve 3 has two sections A in opposite relationship which are locally flattened (compare FIGS. 1a and 1b), i.e. are non-round. The intermediate sleeve 4, which is also generally spherically configured, has overall four such non-round sections A, with two of the non-round sections A being arranged on an inner surface 4b in opposition to one another, and the two other non-round sections A being arranged on the outer surface 4a in opposition to one another. The non-round sections A of the outer surface 4a and the inner surface 4b alternate every 90° during revolution, i.e. the non-round sections A of the outer surface 4a and the inner surface 4b are disposed in offset relationship. When assembling the rubber-metal sleeve bearing 1, the non-round sections A of the inner sleeve 3 and the non-round sections A of the inner surface 4b of the intermediate sleeve 4 are disposed adjacent to one another.

Figure 2:
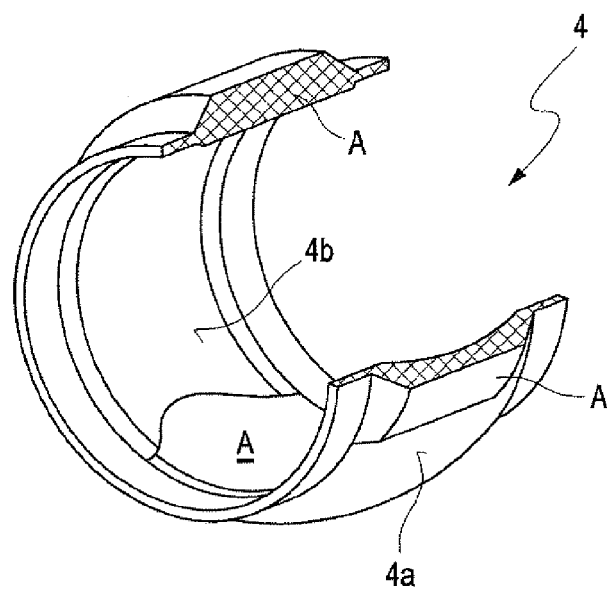

FIG. 2 is a perspective, partly sectional illustration of a detail of the intermediate sleeve 4 of the rubber-metal sleeve bearing 1. The basic cylindrical configuration transitions on the middle path to a generally spherical configuration, with the inner surface 4b being concave and the outer surface 4a being convex. The inner surface 4b has two opposing non-round sections A, where the concave shape is replaced by a flat region. Disposed offset at a right angle are two non-round sections A on the outer surface 4a, where the convex configuration is also being replaced by a flat region. The intermediate sleeve 4 of plastic is produced by an extrusion process.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A rubber-metal sleeve bearing, comprising:
    an outer sleeve having an axis;
    an inner sleeve disposed in concentric relationship to the outer sleeve; and
    an intermediate sleeve disposed in concentric relationship to the inner and outer sleeves and having first and second elastomer layers to connect the intermediate sleeve to the inner and outer sleeves, respectively, said intermediate sleeve having inner and outer surfaces, each having at least one non-round section, with the non-round section of the inner surface and the non-round section of the outer surface being arranged in offset relationship in a circumferential direction around the axis.

2. The rubber-metal sleeve bearing of claim 1, wherein the inner sleeve has an outer surface having at least one non-round section, with the non-round section of the outer surface of the inner sleeve and the non-round section of the inner surface of the intermediate sleeve arranged adjacent to one another in a radial direction.

3. The rubber-metal sleeve bearing of claim 1, wherein the inner and outer surfaces of the intermediate sleeve have each two non-round sections in opposition to one another.

4. The rubber-metal sleeve bearing of claim 1, wherein at least one of the inner and outer surfaces of the intermediate sleeve has a spherical configuration, with the non-round section of the inner surface and the non-round section of the outer surface each being configured as flat areas.

5. The rubber-metal sleeve bearing of claim 1, wherein the inner sleeve has an outer surface of spherical configuration, said outer surface having at least one non-round section which is configured as flat area.

6. The rubber-metal sleeve bearing of claim 1, wherein the intermediate sleeve is made of plastic.

7. The rubber-metal sleeve bearing of claim 1, wherein the intermediate sleeve is made by an extrusion process.

8. The rubber-metal sleeve bearing of claim 1, wherein the inner sleeve and/or the outer sleeve is made of metal.

* * * * *